(12) United States Patent
Mulder et al.

(10) Patent No.: US 7,052,071 B2
(45) Date of Patent: May 30, 2006

(54) COVER AND LATCH FOR VEHICLE CARGO BED WITH TAILGATE

(75) Inventors: Craig C. Mulder, Dorr, MI (US); John M. Arend, Belmont, MI (US)

(73) Assignee: Steffens Enterprises, Inc., Caledonia, MI (US)

( * ) Notice: Subject to any disclaimer, the term of this patent is extended or adjusted under 35 U.S.C. 154(b) by 0 days.

(21) Appl. No.: 10/855,262

(22) Filed: May 27, 2004

(65) Prior Publication Data

US 2005/0264024 A1 Dec. 1, 2005

(51) Int. Cl.
*B60P 7/02* (2006.01)

(52) U.S. Cl. ............... 296/100.07; 296/100.06; 296/100.1

(58) Field of Classification Search ........... 296/100.07, 296/100.04, 100.05, 100.1, 57.1, 37.6, 100.09, 296/100.06, 100.02, 98, 100.18; 292/201, 292/113, 16, 169, 63, 71; 224/404
See application file for complete search history.

(56) References Cited

U.S. PATENT DOCUMENTS

| | | | | |
|---|---|---|---|---|
| 3,923,334 A | * | 12/1975 | Key ................. | 296/100.07 |
| 4,615,557 A | * | 10/1986 | Robinson ............ | 296/100.07 |
| 4,756,571 A | * | 7/1988 | Lake ................. | 296/100.1 |
| 4,824,162 A | * | 4/1989 | Geisler et al. ........ | 296/100.09 |
| 5,632,522 A | * | 5/1997 | Gaitan et al. ......... | 296/100.06 |
| 5,857,729 A | * | 1/1999 | Bogard .............. | 296/100.07 |
| 5,957,525 A | * | 9/1999 | Nelson .............. | 296/100.06 |
| 6,076,881 A | * | 6/2000 | Tucker .............. | 296/100.07 |
| 6,152,513 A | * | 11/2000 | Karrer .............. | 296/37.6 |
| 6,203,086 B1 | * | 3/2001 | Dirks et al. .......... | 296/100.07 |
| 6,227,602 B1 | * | 5/2001 | Bogard .............. | 296/100.07 |
| 6,520,558 B1 | * | 2/2003 | Katterloher et al. ... | 296/100.07 |
| 6,641,200 B1 | * | 11/2003 | Rusu ................ | 296/100.07 |
| 6,676,174 B1 | * | 1/2004 | Reynolds et al. ...... | 292/32 |
| 6,712,418 B1 | * | 3/2004 | Lathers .............. | 296/100.06 |
| 6,764,125 B1 | * | 7/2004 | Bacon ............... | 296/100.06 |
| 6,896,313 B1 | * | 5/2005 | Mack et al. .......... | 296/100.06 |
| 2002/0005651 A1 | * | 1/2002 | Young et al. .......... | 296/100.1 |
| 2004/0245799 A1 | * | 12/2004 | Ruse ................ | 296/100.06 |
| 2005/0029832 A1 | * | 2/2005 | Verduci et al. ........ | 296/100.06 |

* cited by examiner

*Primary Examiner*—Kiran B. Patel
(74) *Attorney, Agent, or Firm*—Warner Norcross & Judd

(57) ABSTRACT

A latching and locking system for a cover for the cargo bed of a vehicle having a tailgate. The system includes a cover latch, a first manual operator for releasing the cover latch, and a second automatic operator for automatically releasing the cover latch if the tailgate is moved to its closed position when the cover is closed and locked. The system includes a single cable interconnecting the latch and the first and second operators. The second operator carries a movable tailgate latch. Finally, the system includes a single lock operatively connected to both the first operator and the tailgate latch.

11 Claims, 19 Drawing Sheets

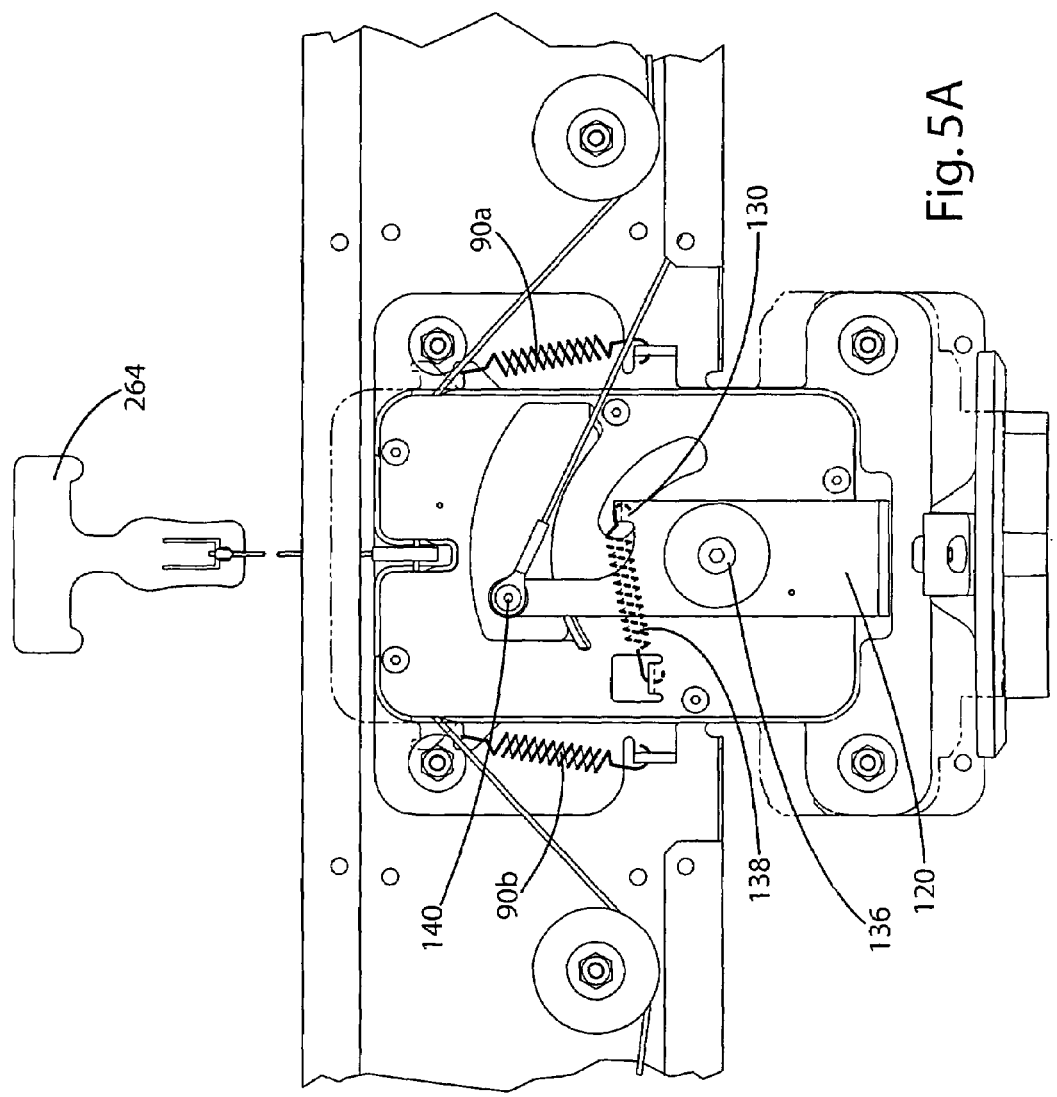

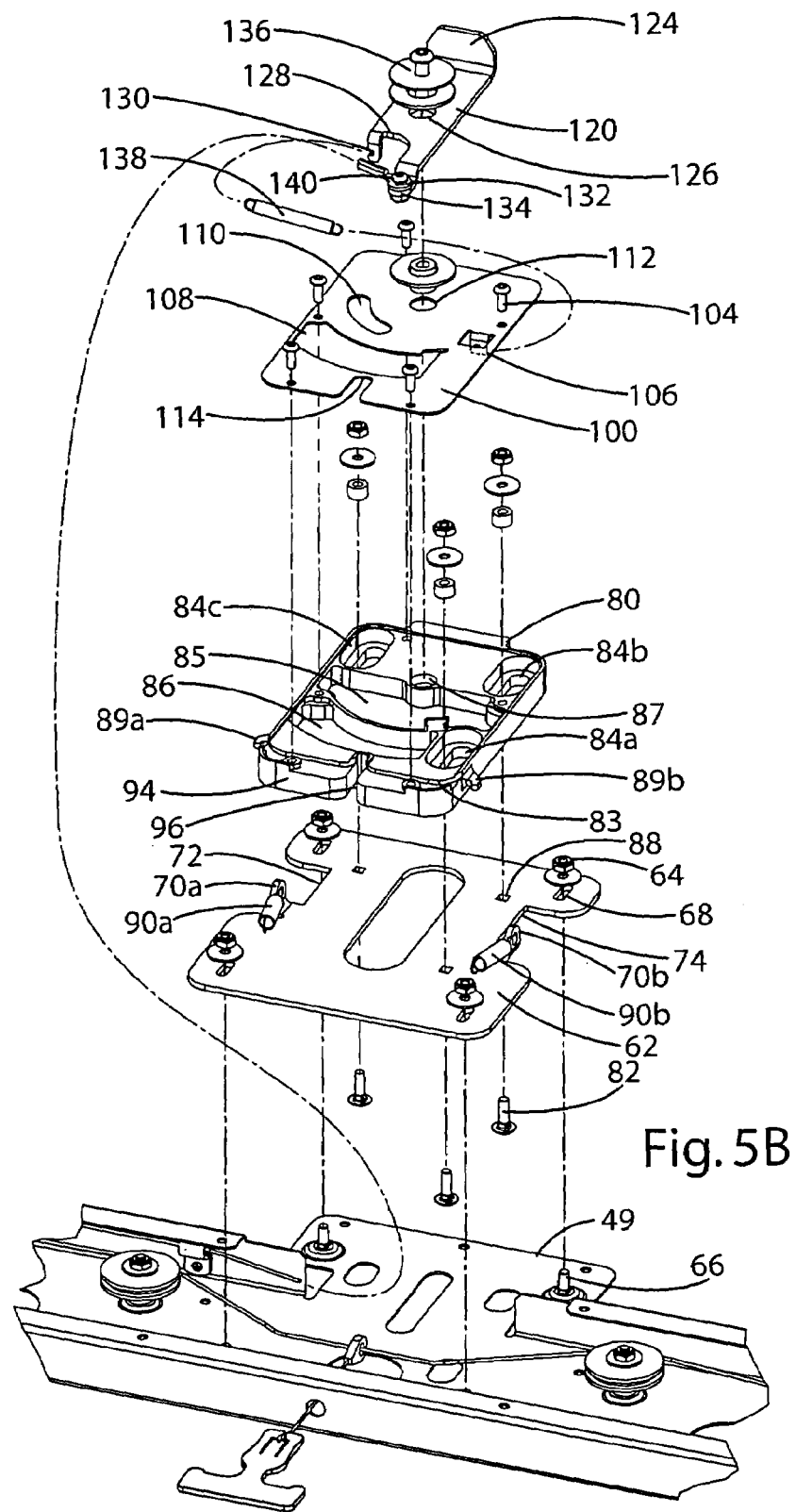

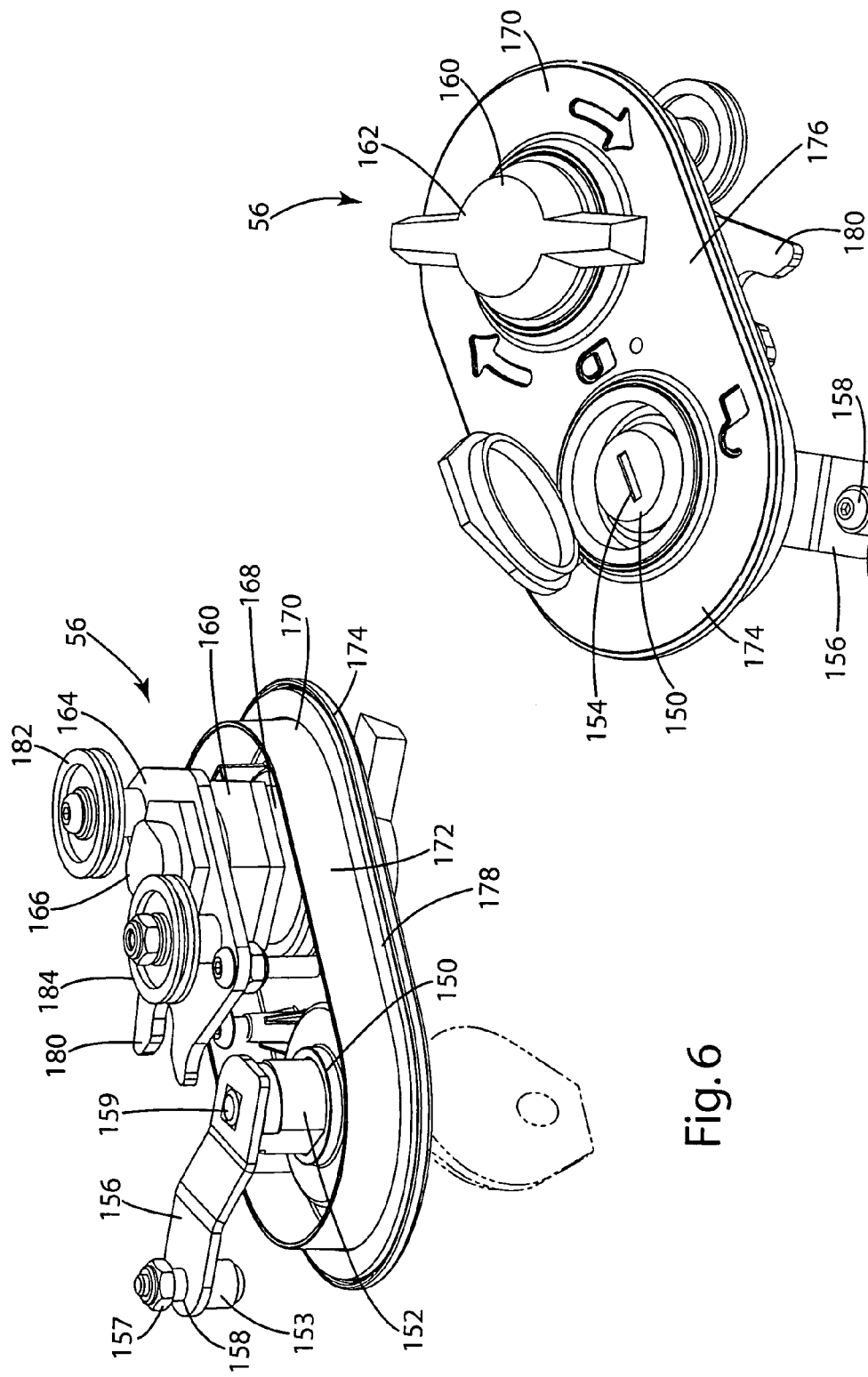

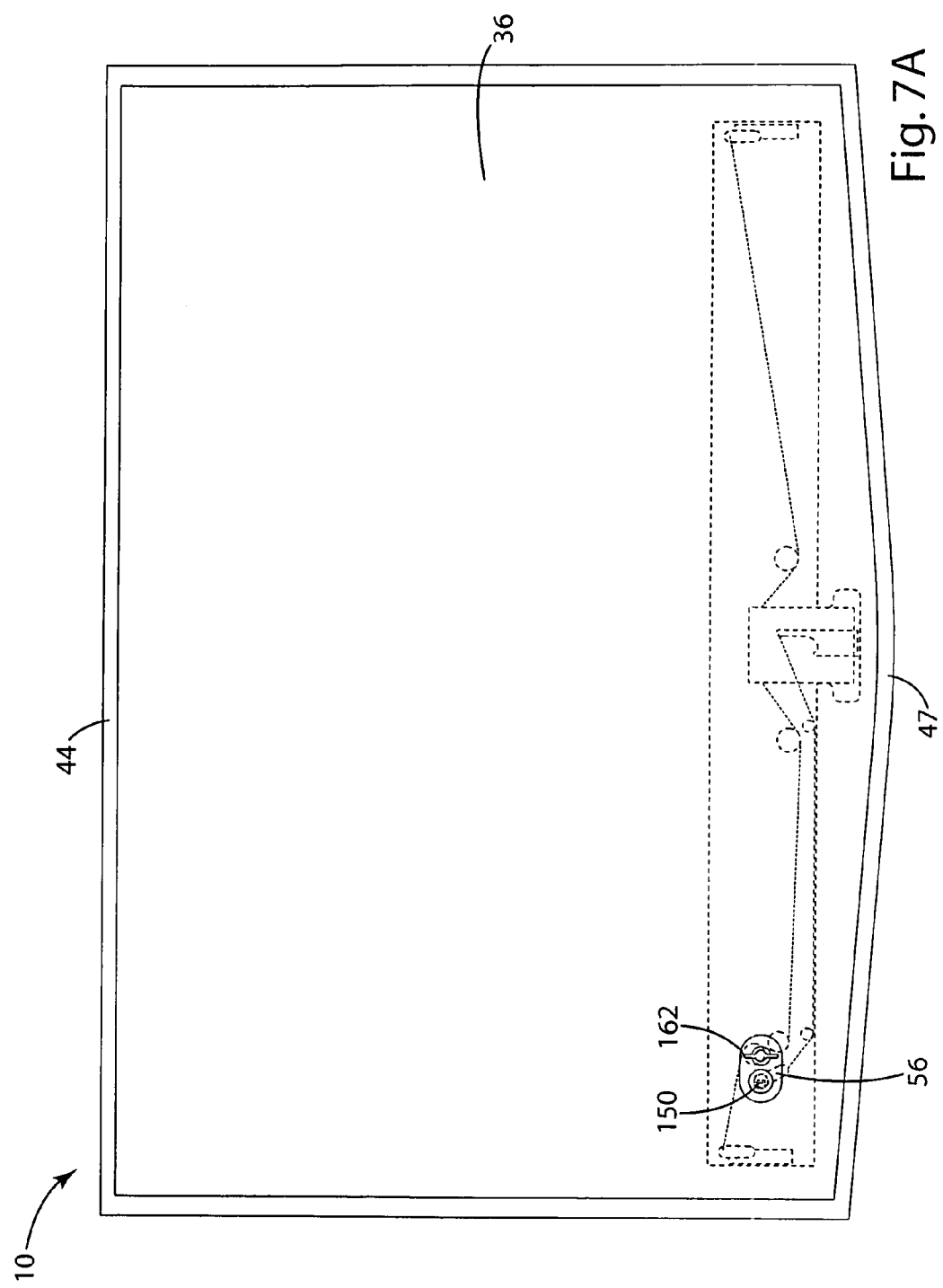

COVER AND LATCH FOR VEHICLE CARGO BED WITH TAILGATE

BACKGROUND OF THE INVENTION

The present invention relates to vehicle cargo beds and more particularly to a cover and a latch mechanism for a vehicle cargo bed having a tailgate.

It is well known to provide a cover for the cargo bed of a pickup truck, a sport utility vehicle, or other vehicle to enhance the vehicle appearance, to protect the cargo from weather, and to prevent theft. One common style of cover includes a panel that covers substantially the entire cargo bed and is hingedly attached to the front of the bed. A latch mechanism is included at the rear portion of the cover to releasably retain the cover in a closed position against the bed. The latch typically includes a lock to prevent unwanted opening of the cover.

Since many tailgates do not have locks, the covers also often include separate locks for securing the tailgate in the closed position. A common design includes a ring affixed to the tailgate and a corresponding lock on the cover. The lock actuates a rotatable tab, and when the cover and tailgate are both closed, the lock may be actuated so that the tab engages the ring and locks both the cover and tailgate closed.

Unfortunately, these cover designs suffer from a number of disadvantages, particularly in the usability of the locking and latching mechanisms. First, it is awkward for a user to operate one actuator for latching and unlatching the cover, and a separate actuator for locking the cover and the tailgate. Second, if the cover is closed while the tab is in the locked position, the tailgate cannot be completely shut without first unlocking the tab. Third, if the tailgate is accidentally slammed shut with the tab in its locked position, the impact can damage the lock and/or the tailgate.

SUMMARY OF THE INVENTION

The aforementioned problems are overcome by the present invention, wherein a cargo bed cover is provided with a latching/locking mechanism that 1) controls all of latching of the cover, locking of the cover, and locking of the tailgate; 2) permits both the cover and the tailgate to be locked with a single key; and 3) prevents damage to the latch mechanism and/or the tailgate if the tailgate is moved to the closed position while the cover is closed.

The latching mechanism unlatches the cover in response to either 1) manual operation of the mechanism or 2) automatic operation of the mechanism if the tailgate is moved to the closed position while the cover is closed. As disclosed, the latching mechanism includes a pair of cover latches for holding the cover closed, a cable connected to the cover latches, a first manually operated actuator, and a second automatically operated actuator. Both operators are actuated by this cable. The first actuator can be used manually to unlatch the cover. The second actuator operates automatically to unlatch the cover if the tailgate is moved to the closed position while the cover is closed and locked. This aspect of the invention prevents damage to the latching/locking mechanism, the cover, and/or the tailgate if the tailgate is moved to the close position while the cover is closed and locked or closed while locked.

As more specifically disclosed, the second actuator includes a tailgate latch for selectively retaining the tailgate in its closed position. The second actuator is mounted for reciprocal movement between forward and rearward positions (with respect to the vehicle), and is biased to the rearward or home position. The second actuator pulls the cable, releasing the cover latches, when the actuator is moved to the forward position. If the tailgate is moved to the closed position while the cover is closed and locked, the tailgate will push the second actuator from its home position to its forward position, which in turn pulls the cable and releases the cover latches.

As further specifically disclosed, the cover and tailgate can be locked and unlocked with a single lock and key. The lock is operatively connected to both the first manual actuator and the second automatic actuator. The lock is capable of preventing manual actuation of the knob and movement of the tailgate latch, while still permitting the second actuator to slide in response to a slamming tailgate.

These and other objects, advantages, and features of the invention will be more fully understood and appreciated by reference to the description of the current embodiment and the drawings.

BRIEF DESCRIPTION OF THE DRAWINGS

FIG. 5A is a bottom view of the siding plate with a second position in broken lines.

FIG. 5B is an exploded view of the sliding plate.

FIG. 6 is a bottom perspective view of the lock and knob.

FIG. 7 is a top perspective view of the lock and knob.

FIG. 7A is a top view of the cover.

DESCRIPTION OF THE CURRENT EMBODIMENT

Figure 1:
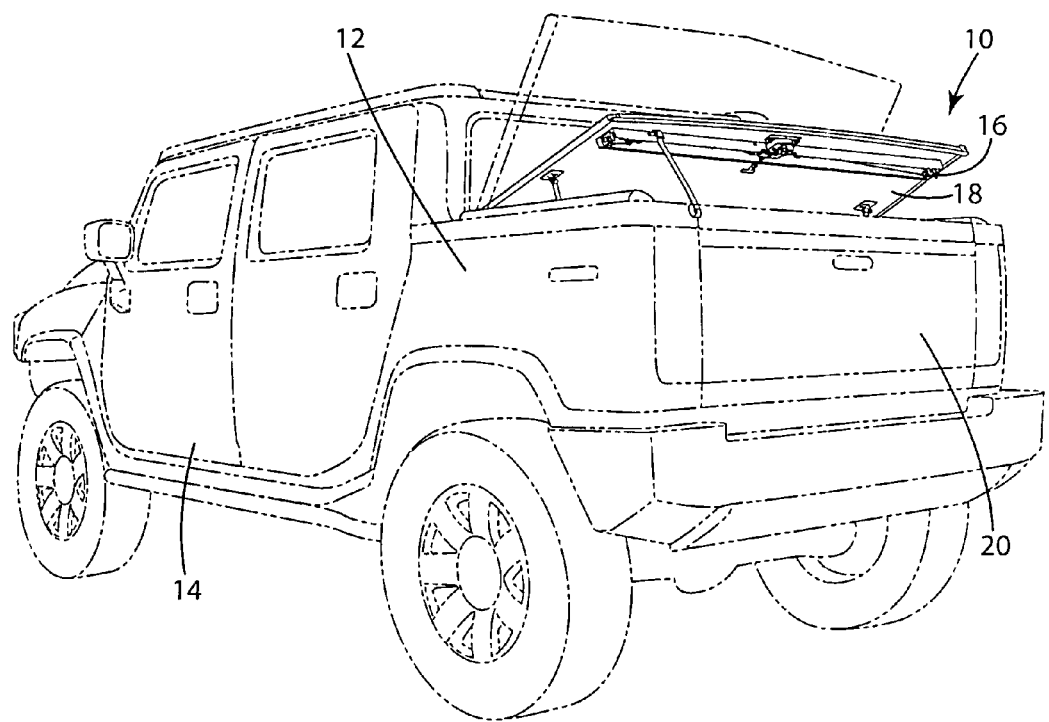
FIG. 1 is a perspective view of the cover installed on a cargo bed.

A truck cargo bed cover is shown in FIG. 1 and generally designated 10. The cover 10 is pivotally attached to a cargo bed 12. As illustrated, the cover 10 is attached to the cargo bed 12 of a sport utility vehicle 14. However, the cover 10 may alternatively be attached to a wide variety of cargo beds. The cover 10 includes a latch mechanism 16 extending along the lower surface 18 of the cover. The latch mechanism 16 allows the cover 10 to lock in a closed position, and provides a lock for the tailgate 20 when the tailgate 20 is closed. As described, all directional language such as "front," "rear," "left," and "right" are referenced with respect to the front and rear of the illustrated vehicle 14.

I. Structure

Figure 2:
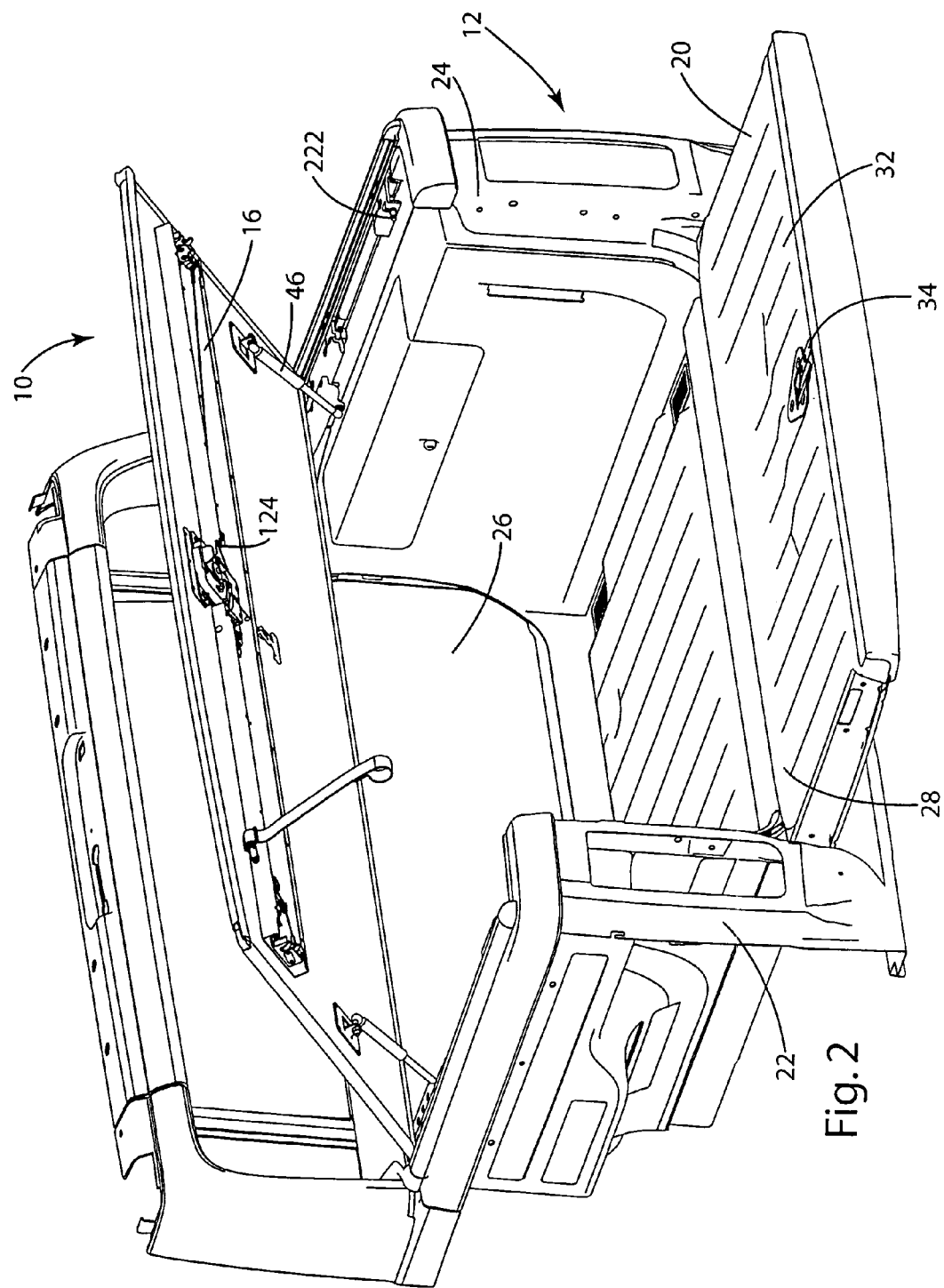
FIG. 2 is a perspective view of the cover installed on a cargo bed with the tailgate open.
Figure 8:
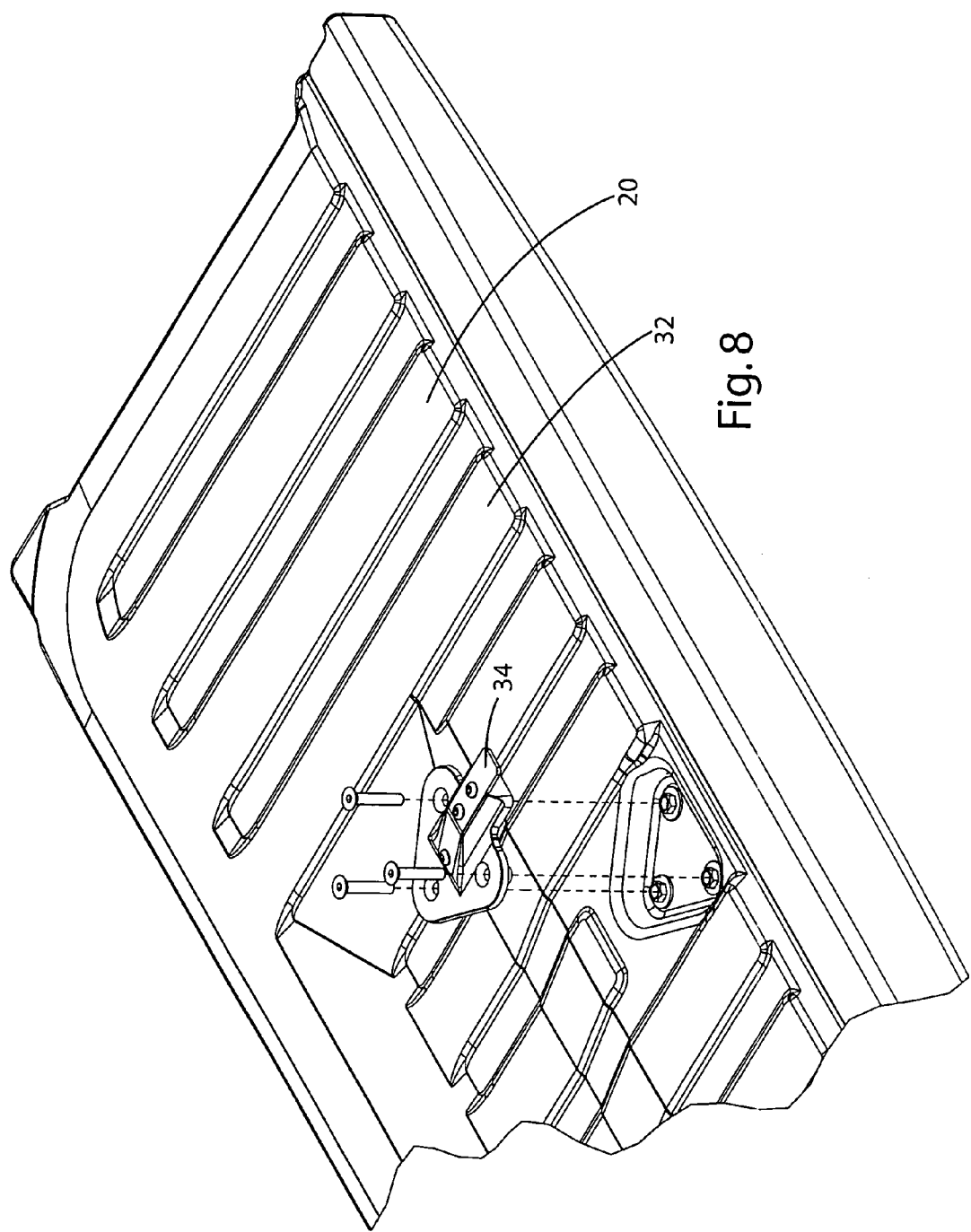
FIG. 8 is an exploded view of the tailgate impact tab.

As shown in FIG. 2, the cargo bed 12 generally includes a pair of upstanding side walls 22 and 24, a front wall 26, and a tailgate 20. The lower edge 28 of the tailgate 20 is conventionally pivotally attached to between the side walls 22 and 24, such that it has an open position wherein the tailgate 20 lies in a plane with the floor 30 of the cargo bed 12, and a closed position wherein the tailgate is parallel to the front wall 26. The tailgate 20 generally includes a conventional tailgate latch (not shown) such that it can be held on the closed position. Shown in FIG. 8, the inner surface 32 of the tailgate includes an impact tab 34 conventionally attached to the tailgate 20 and positioned for engagement with the latch mechanism 16 of the cover 10.

Figure 3:
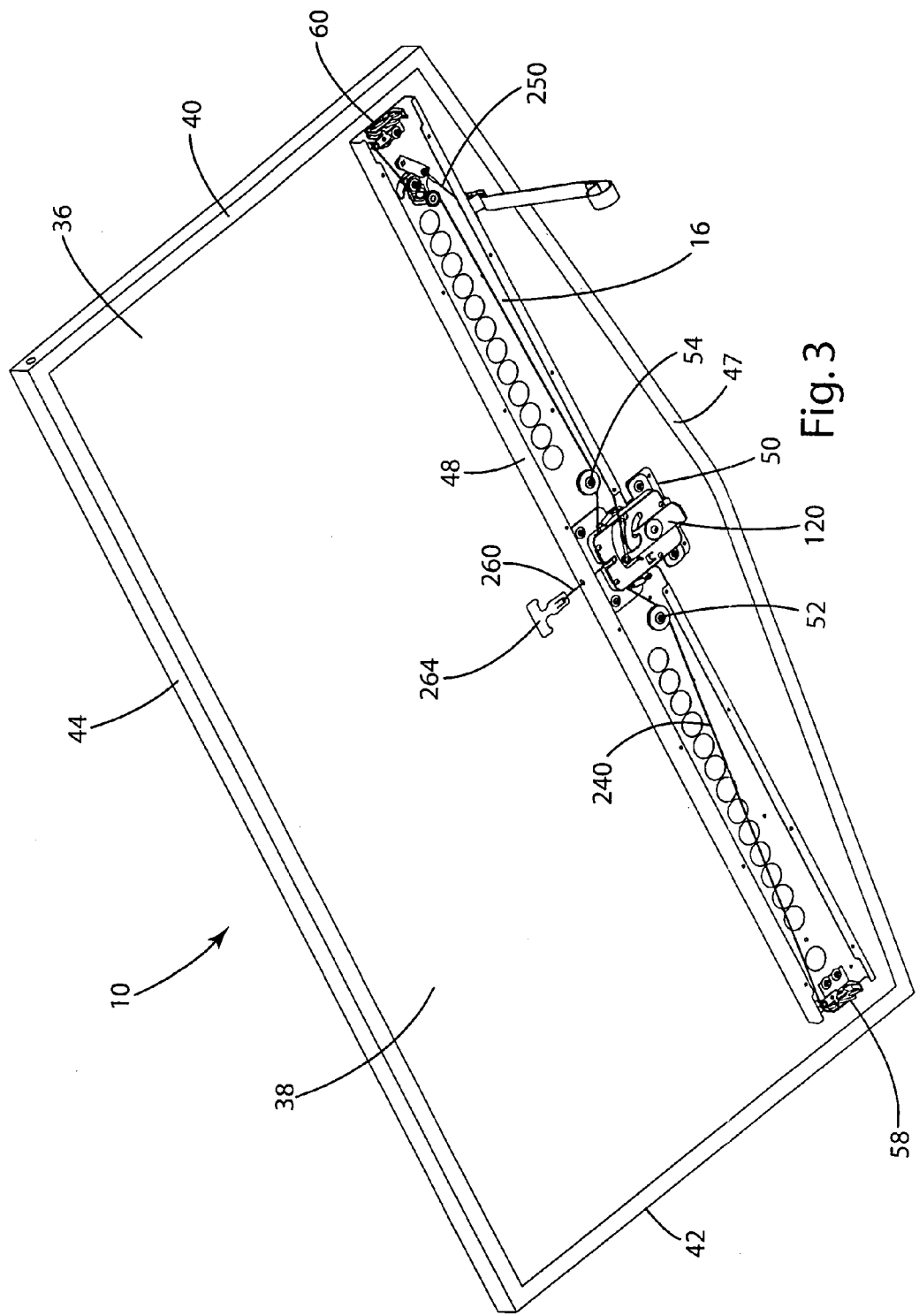
FIG. 3 is a bottom view of the cover and latch mechanism.

Shown in FIG. 3, the cover 10 includes a generally planar panel 36. The panel 36 includes a lower surface 38, left and right edges 40 and 42, a front edge 44, and a rear edge 47. The front edge 44 is conventionally pivotally attached to the side walls 22 and 24 of the cargo bed 12 near the front wall 26, for instance, by a rod (not shown) extending through the front edge 44 of the panel 36 and into corresponding holes (not shown) in the side walls 22 and 24. One or more conventional lift cylinders 46 may be attached between the lower surface 38 and the side walls 22 and 24 to aid the cover 10 in opening and closing and to hold the cover 10 in an open position.

Figure 4:
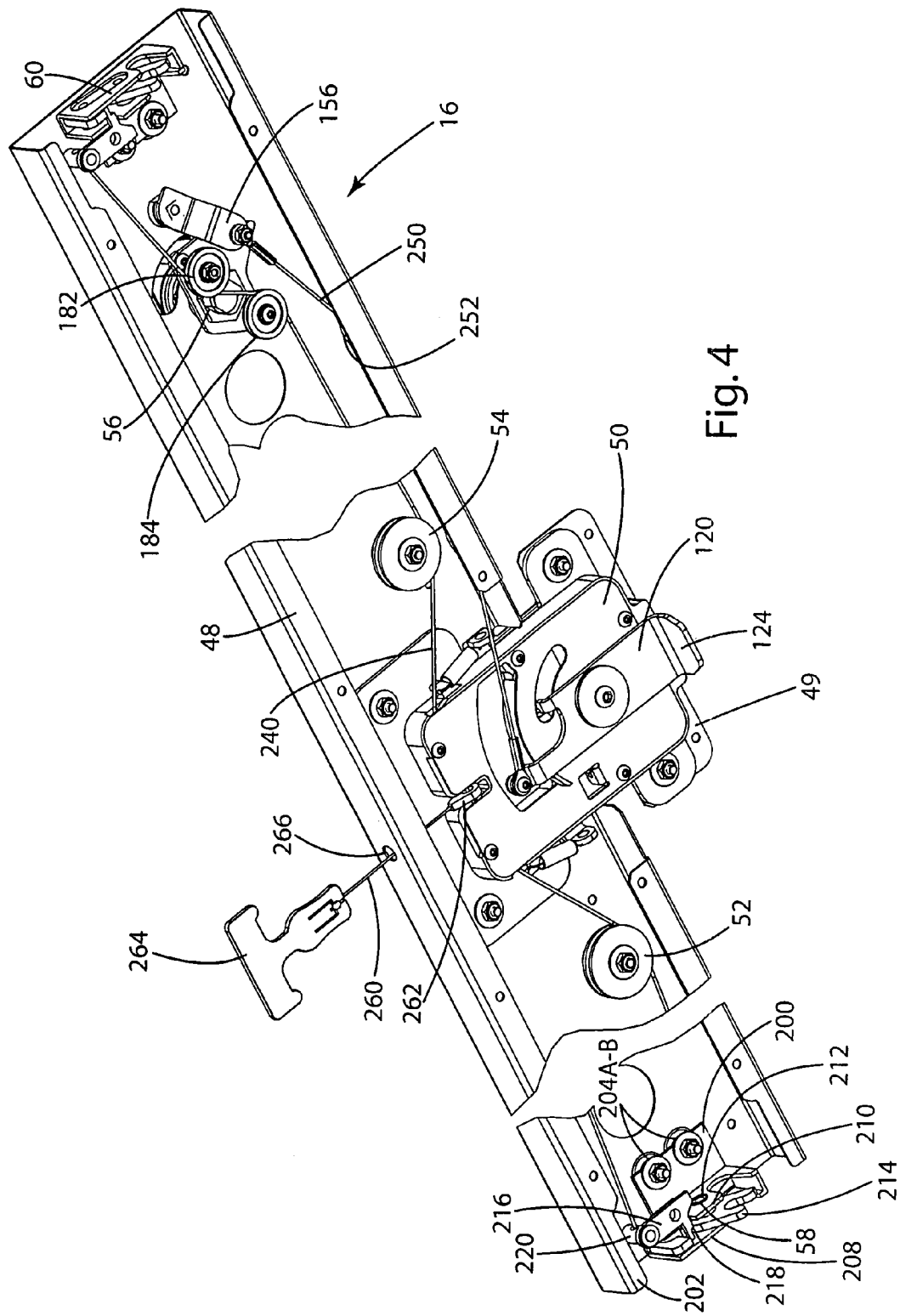
FIG. 4 is a bottom view of the latch mechanism.
Figure 5:
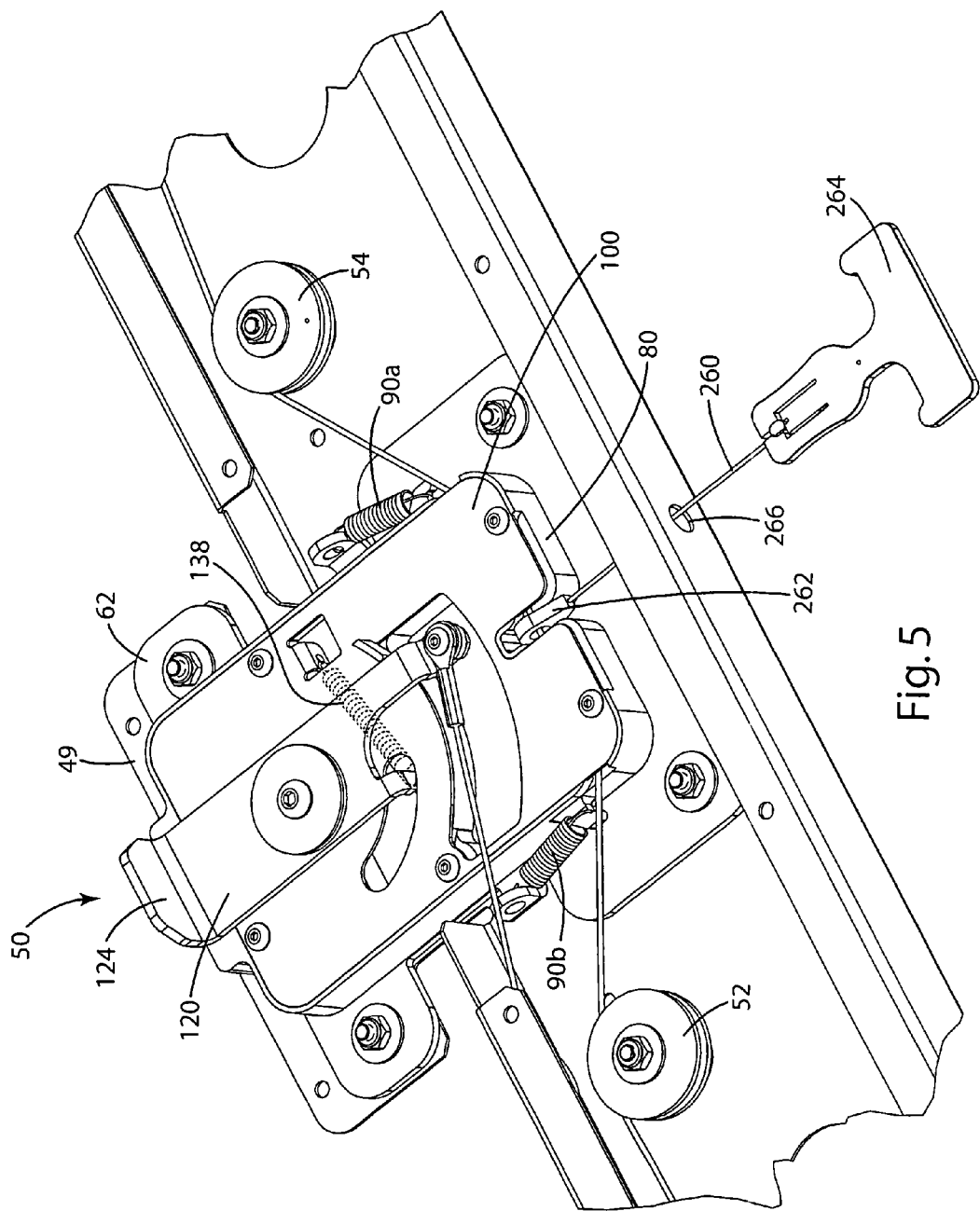
FIG. 5 is a bottom view of the sliding plate.
Figure 5C:
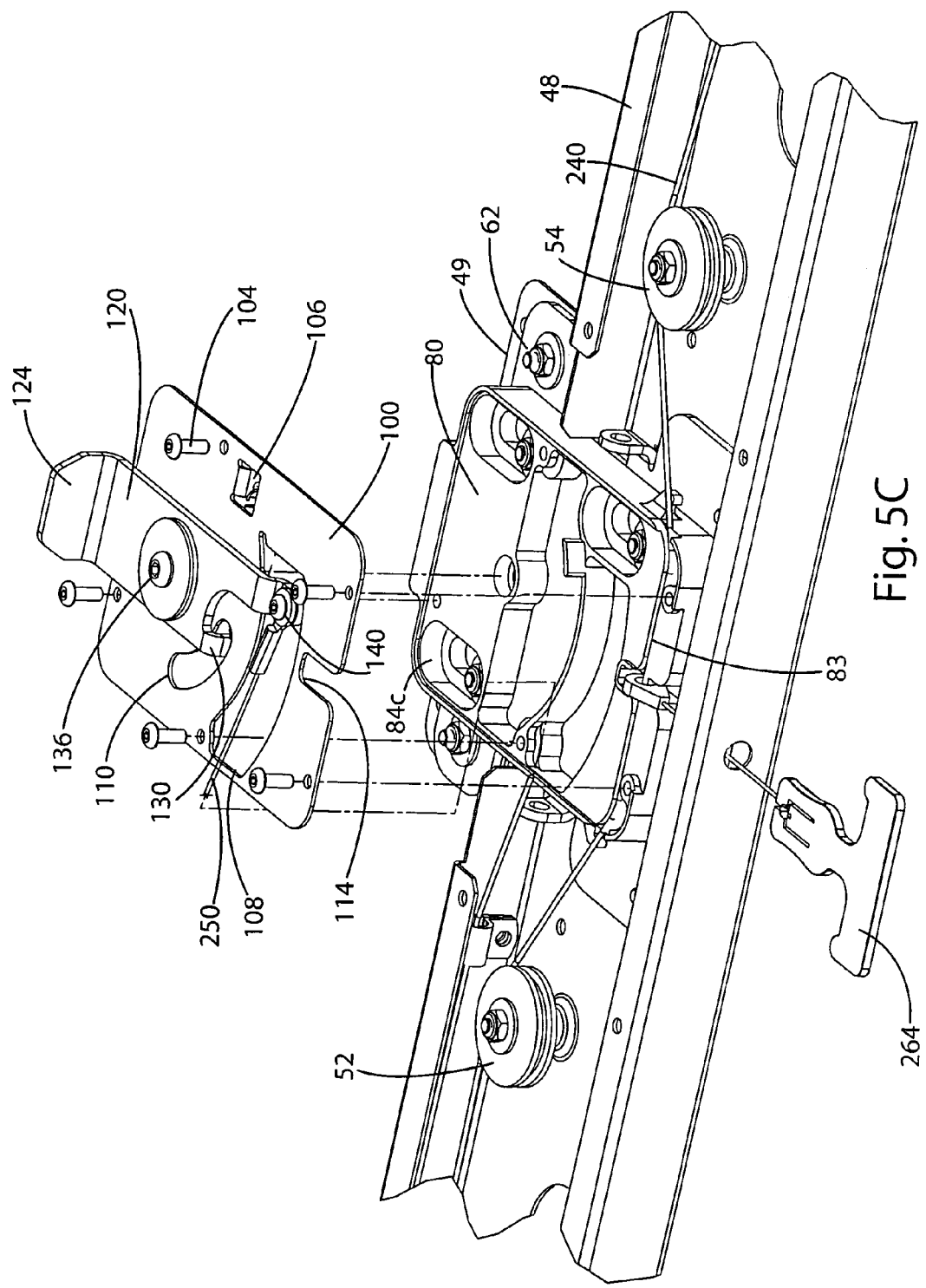
FIG. 5C is a partially exploded view of the sliding plate.

As shown in FIG. 4, the latch mechanism 16 includes an elongated rail 48 that extends along the lower surface 38 of the panel 36. In one embodiment, the rail 48 as illustrated is C-shaped except for a flattened out mounting flange 49 in the central portion of the rail 48. The rail 48 is attached to the panel 36 by screws or other conventional fasteners (not shown). Mounted to the inside of the rail is a sliding plate assembly 50, a pair of cable pulleys 52 and 54, an actuation assembly 56, and a pair of catch assemblies 58 and 60.

The catch assemblies 58 and 60, shown in FIG. 4, are generally conventional, and therefore will not be described in great detail. Furthermore, the assemblies 58 and 60 are essentially mirror images of each other with one at each end of the rail 48, so the detail will be provided only with respect to catch assembly 58. Suffice it to say that a mounting plate 200 is rigidly attached to the end 202 of the rail 48 by conventional means, such as bolts 204a–b. The plate 200 supports a bracket 206 extending outwardly from the plate 200 having an outer wall 208 and an inner flange 210. A pin 212 extends between the outer wall 208 and the flange 210, rotatably supporting a catch 214, such that the catch 214 has a first, release position approximately perpendicular to the plate 200, and a second, secure position parallel to the plate 200. A second pin 220 is rotatably attached to the rail 48 and supports an arm 216 and a finger 218 extending from the arm 216. The finger 218 is positioned such that when the arm 216 rotates, the finger 218 engages the catch 214 and moves the catch 214 between the release position and the secure position. The rail 48 is positioned such that when the cover 10 is closed, the catch 214 engages a pin 222 (FIG. 2) extending from the side wall 24 (or 22) of the cargo bed 12 to hold the cover closed when in the secure position.

The sliding plate assembly 50, shown in FIGS. 5, 5A, 5B, and 5C, includes a mounting plate 62 that is attached to the flange 49 by a plurality of conventional fasteners 64, such as nuts and bolts, extending through holes 66 in the rail 48 and corresponding holes 68 in the mounting plate 62. The mounting plate 62 includes a pair of upstanding grommets 70a–b extending from opposite sides 72 and 74 of the mounting plate 62.

A sliding tray 80 is slidably attached to the mounting plate 62. In one embodiment, the tray 80 is generally rectangular and includes three elongated slots 84a–c, a channel 83, an arc shaped cutout 86, a central cutout 85, a central hole 87, and a pair of prongs 89a–b extending from opposite sides of the tray 80. The tray 80 is fastened to the mounting plate 62 by three conventional fasteners 82 that extend through holes 88 in the mounting plate 62 and through the elongated slots 84a–c such that the tray 80 can slide relative to the mounting plate 62 as the fasteners 82 slide back and forth in the slots 84a–c. Springs 90a–b are attached between the prongs 89a–b and the grommets 70a–b in order to bias the sliding tray 80 in a rearward position. The front edge 94 of the tray 80 includes a notch 96 extending inwardly through a portion of the tray 80. The channel 83 extends transversely across the tray 80, and through the notch 96.

A tray cover 100 is attached over the sliding tray 80. The tray cover 100 is generally rectangular in shape to correspond with the shape of the tray 80. In one embodiment, the tray cover 100 includes a plurality of mounting holes 102 for fixedly attaching the tray cover 100 to the tray 80 with conventional fasteners 104, such as nuts and bolts. The tray cover 100 further includes a upwardly extending grommet 106, a first arc shaped cutout 108 corresponding to the shape of the cutout 86 in the tray 80, a second arc shaped cutout 110 that is generally smaller than the cutout 108, a central hole 112, and a notch 114 corresponding to the shape of the notch 96 in the tray 80.

An impact plate 120 is rotatably attached to the tray cover 100. The impact plate 120 is generally an elongated member having a first end 122 with a flange 124 extending at a square angle from the first end 122, a central hole 126, and a second end 128 including an upwardly extending prong 130 and a finger 132 containing a mounting hole 134. The impact plate 120 attaches to the cover 100 by a conventional bolt 136 extending through the central hole 126 of the impact plate, the central hole 112 of the tray cover 100, and the central hole 87 of the tray 80, such that the impact plate 120 can rotate about the bolt 136. The prong 130 extends through the second arc shaped cutout 110 of the tray cover 100 and a spring 138 is connected between the prong 130 and the grommet 106 of the tray cover 100 to bias the rotatable impact plate. A fastener 140, such as a bolt, extends through the mounting hole 134 and into the first arc shaped cutout 108 of the tray cover 100 and the arc shaped cutout 86 of the tray 80.

The actuation assembly 56 is shown in FIGS. 6, 7, and 7A. In one embodiment, the actuation assembly 56 includes a lock mechanism 150, a knob mechanism 160, and a support 170. The support 170 includes a flange 172 and a face 174 having a top surface 176 and a bottom surface 178. The support is conventionally attached to the cover 10 so that the bottom surface 178 of face 172 is adjacent to the top surface of the cover panel 36 and the flange 172 extends through the panel 36 and the rail 48 of the latch mechanism 16. The lock mechanism 150 includes a lock cylinder 152 extending through the support 170 having a key hole 154 on the top surface 176 and an arm 156 opposite the key hole 154. A key fits into the key hole 154 to move the arm from a first locked position to a second unlocked position. The arm 156 includes a fastener 159 extending through the arm 156 for retention to the lock cylinder 152, and further includes a post 158 or similar object extending through an opposite end of the arm 156. One end of the post 158 may include a nut 157, the opposite end may include a barrel or spacer 153. Alternatively, the post 158 may be two separate pieces, one on each side of the arm 156. The knob mechanism 160 includes a knob 162 adjacent with the top surface 176 of the support. The knob 162 is connected to a platform 164 by a bolt 166 that extends through the face 174 of the support 170. The platform 164 and bolt 166 are supported by a housing 168 that is rigidly attached to the lower surface 178 of the face 170 such that the knob 162, platform 164, and bolt 166 are rotatable within the housing 168. The platform 164 is generally a flat plate with a fork 180 extending from one edge. The fork 180 is positioned such that when the arm 156 of the lock mechanism is rotated to a locked position, the barrel 153 extending through the end of arm 156 fits into the fork 180 and prevents the platform 164 and knob 162 from rotation. The platform 164 additionally supports a pair of pulleys 182 and 184.

Referring now to FIGS. 4, 5A, 5B and 5C, the sliding plate assembly 50, cable pulleys 52 and 54, actuation assembly 56, safety pull 264, and catch assemblies 58 and 60 are all tied together by a single latch cable 240. The cable is attached at one end to the pin 220 of the catch assembly 58. The cable 240 then passes around cable pulley 52, and into the sliding plate assembly 50 through the channel 83 and between the tray 80 and tray cover 100. The cable 240 passes around cable pulley 54 and between the pair of pulleys 182 and 184 such that it is drawn around both pulleys 182 and 184. The other end of the cable 240 attaches to the pin 220 of the opposite catch assembly 60. A lock cable 250 attaches at one end to the post 158 of the lock mechanism, extends through a set of guides 252 in the rail 48, and attaches at the opposite end to the fastener 140 on the impact plate 120. A safety cable 260 has a loop 262 on one end that extends around the latch cable 240 within the notch 96 of the sliding plate assembly 50. The safety cable 260 passes through a hole 266 in the rail 48 and the opposite end of the safety cable is attached to a safety handle 264.

II. Operation

Figure 10:
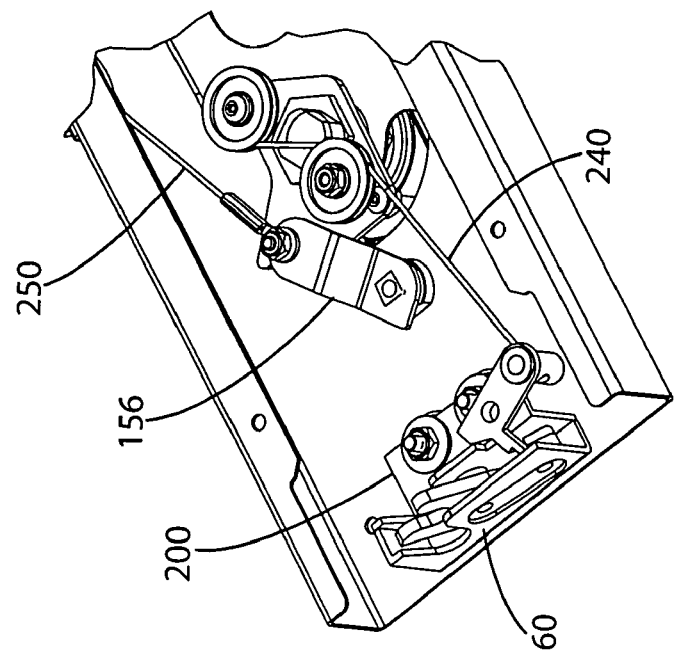
FIG. 10 is a bottom view of the lock in the FIG. 9 position.
Figure 9:
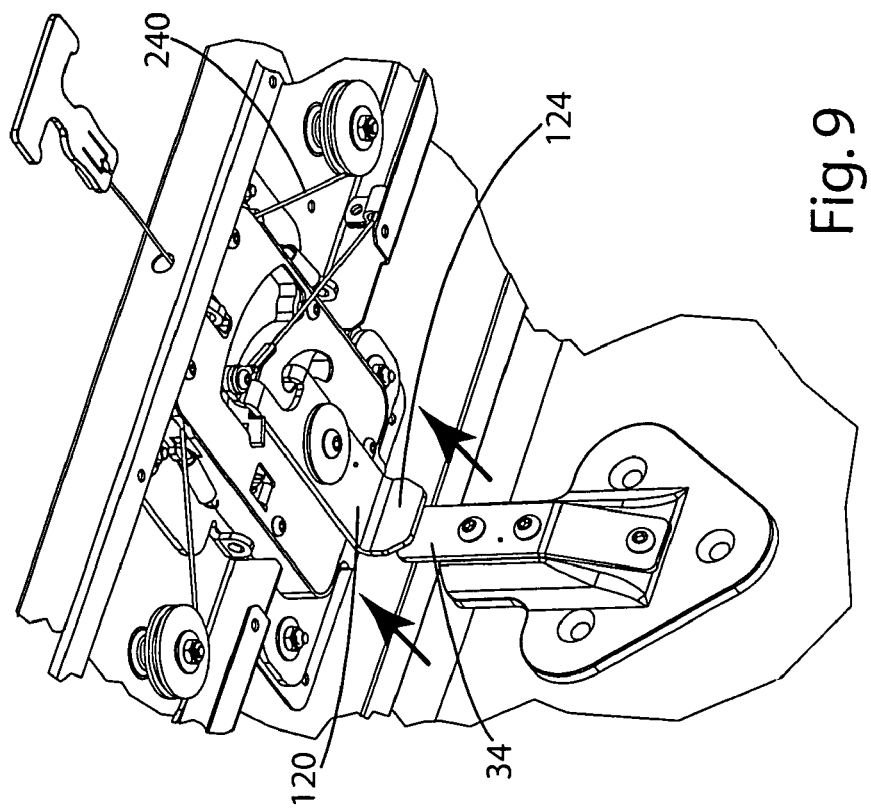
FIG. 9 is a bottom view of the tailgate impacting the latch.
Figure 10A:
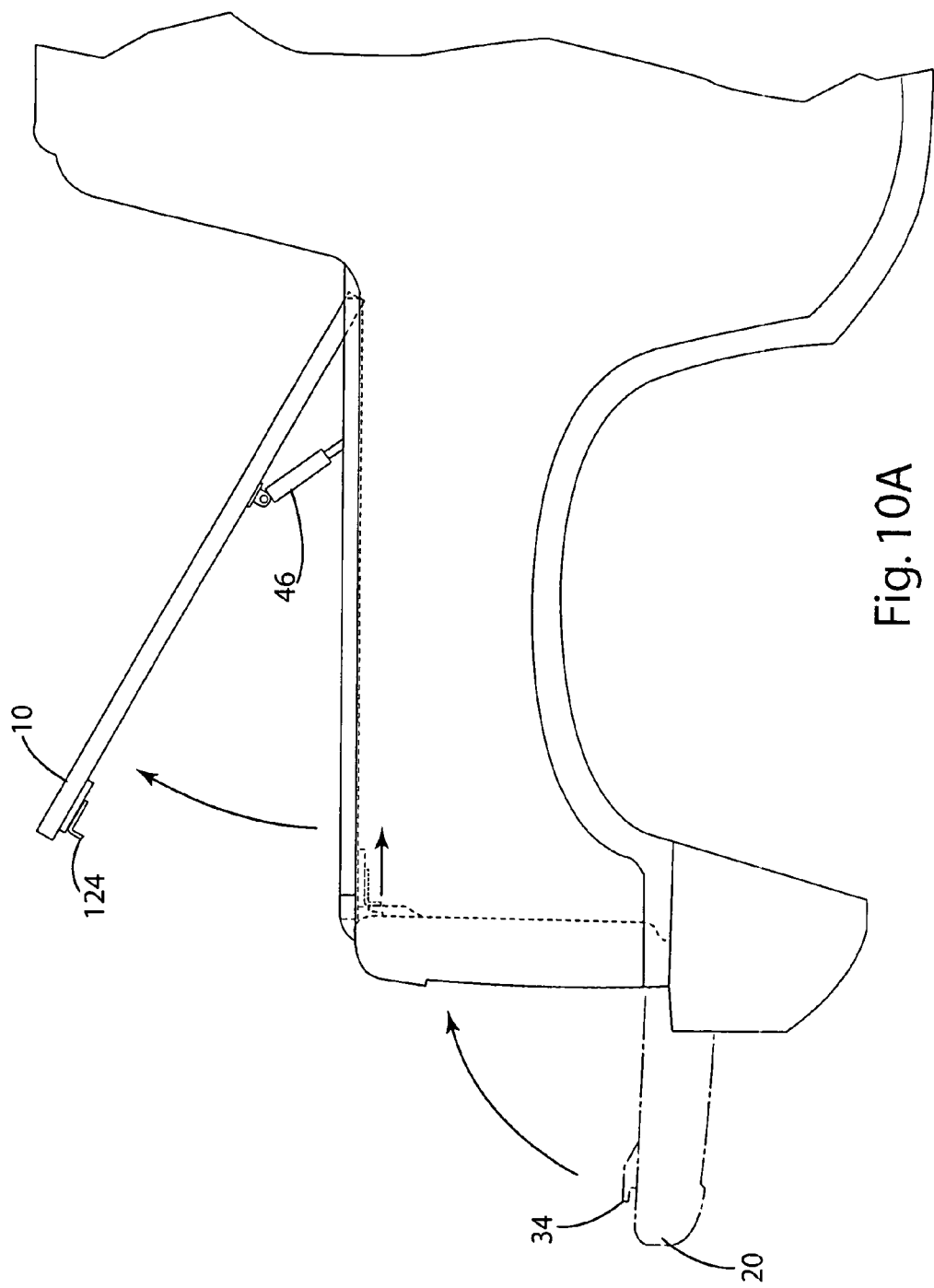
FIG. 10A is a side view of the open tailgate and open cover.
Figure 12:
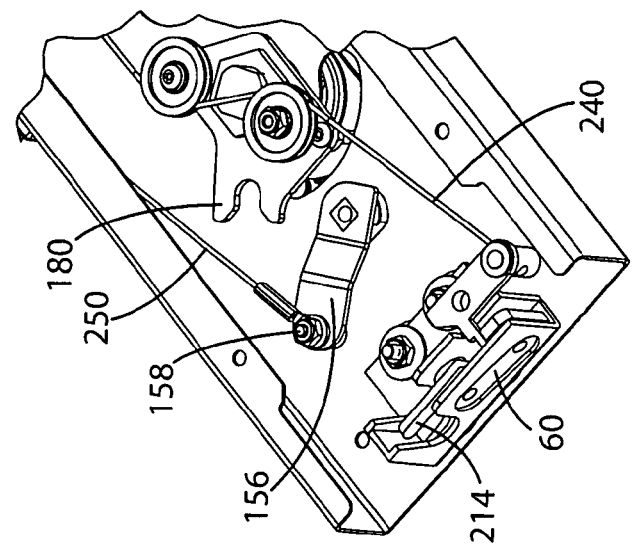
FIG. 12 is a bottom view of the lock in the FIG. 11 position.
Figure 11:
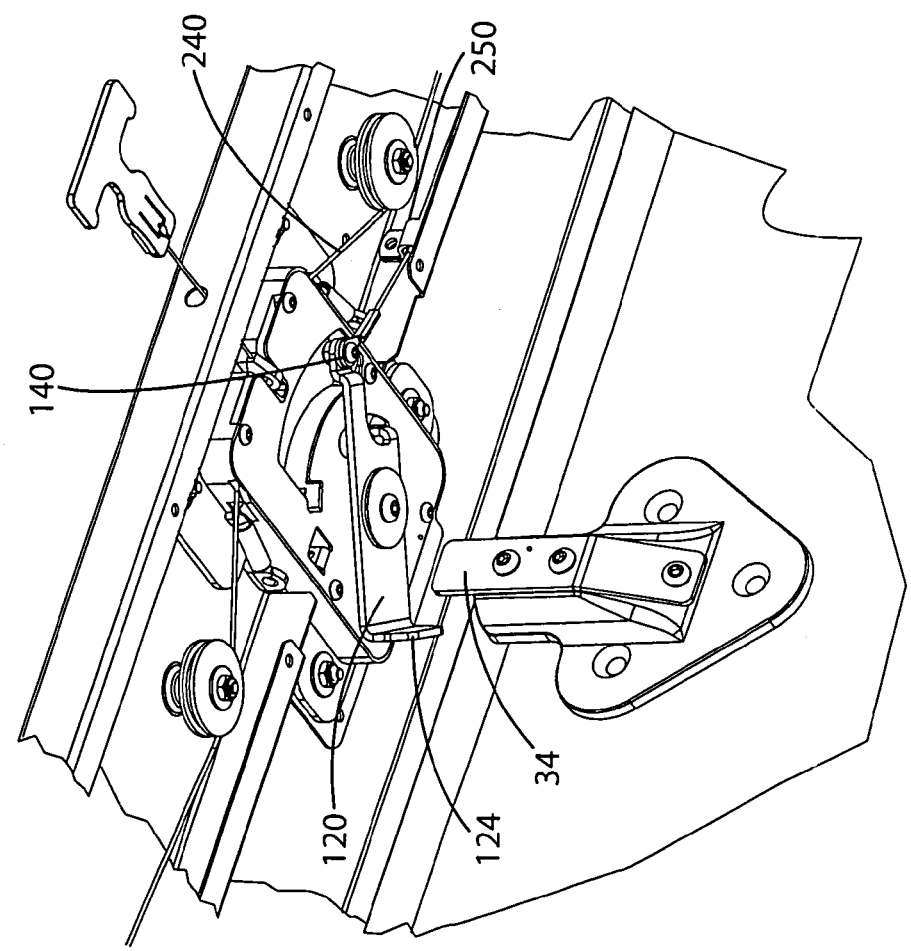
FIG. 11 is a bottom view of the tailgate and latch mechanism with the latch in the unlocked position.
Figure 12A:
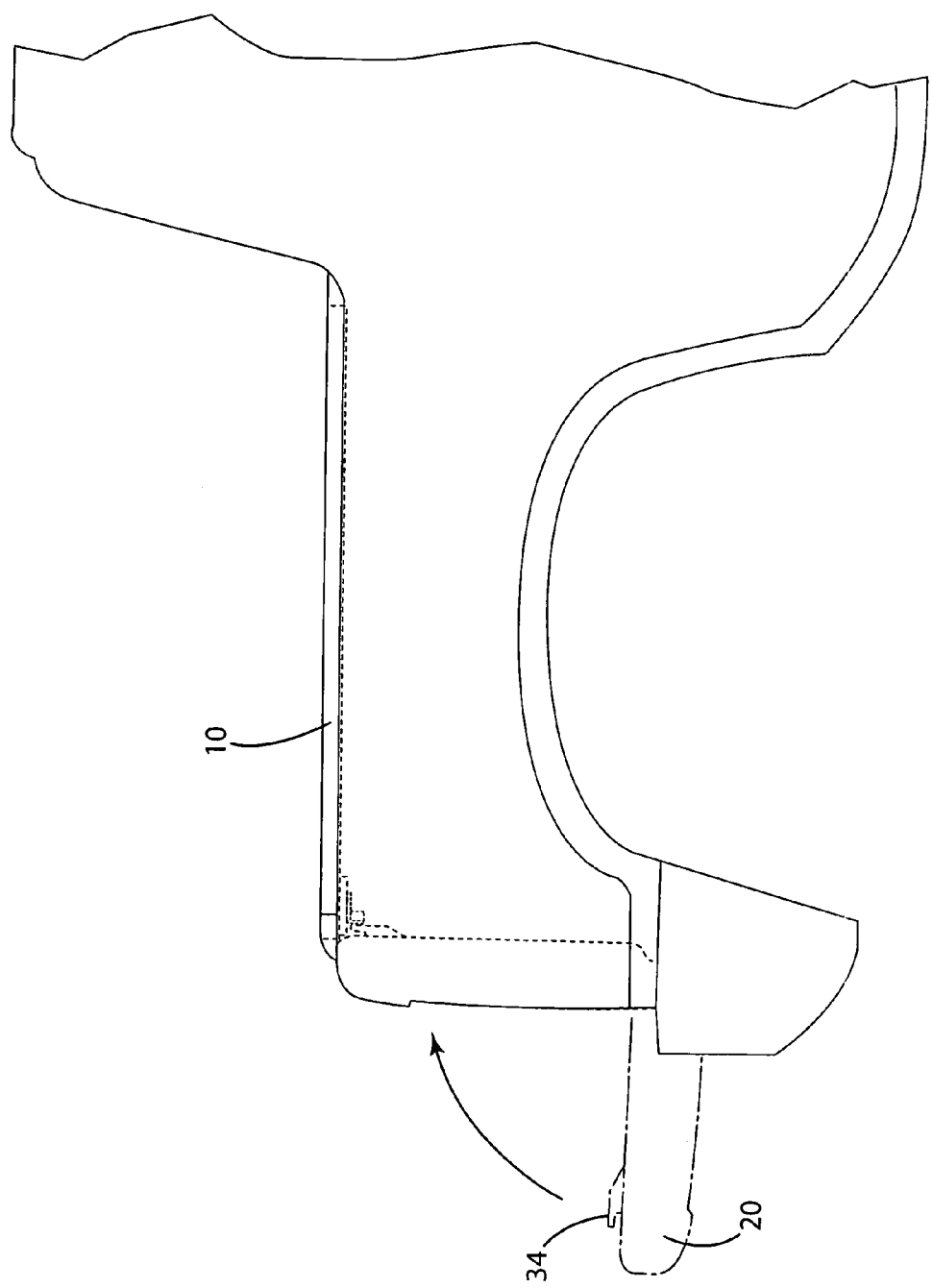
FIG. 12A is a side view of the open tailgate and closed cover.
Figure 15:
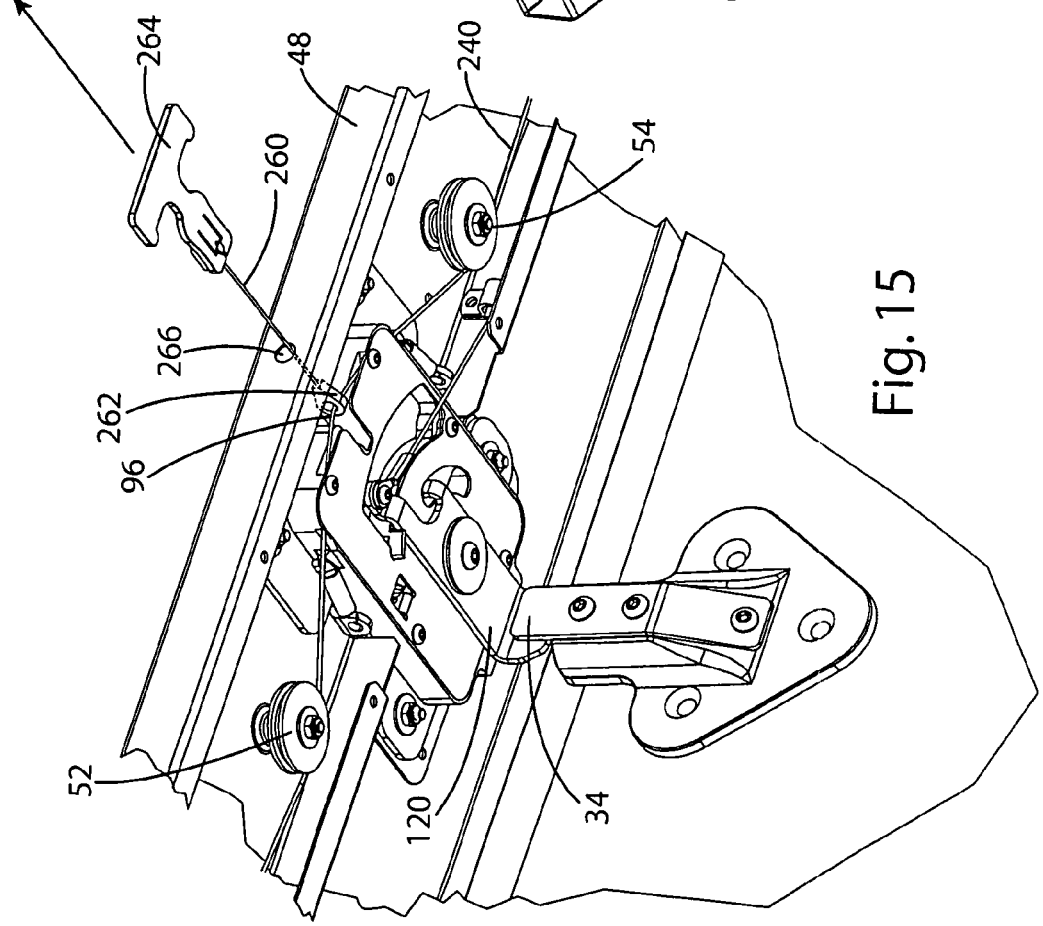
FIG. 15 is a bottom view of the latch mechanism and the tailgate locked with the safety handle pulled.

As shown in FIGS. 9, 10, and 10A, in situations where the cover 10 is originally closed and locked while the tailgate 20 is in an open position, the cover 10 is opened by the tailgate 20 as the tailgate 20 is slammed closed. In operation, as the tailgate 20 is slammed shut, the impact tab 34 contacts the flange 124 of the sliding plate assembly 50. Upon impact with the tab 34, the flange 124, tray 80, and tray cover 100 slide relative to the mounting plate 62 and pull on the latch cable 240. The latch cable 240 pulls through pulleys 52, 54, 182 and 184, and pulls on the arms 216 of the catch assemblies 58 and 60, moving the catches 214 to the released position and allowing the cover 10 to open. If lift cylinders 46 are installed, they can cause the cover 10 to automatically open after the catch assemblies 58 and 60 are released. As shown in FIG. 15, when the cover 10 is re-closed, the flange 124 fits behind the tab 34 to lock the tailgate 20 closed.

As shown in FIGS. 6, 7, 11, 12, and 12A, the impact plate 120 may be rotated to unlock the tailgate 20. As described above, the impact plate 120 is connected to the lock mechanism 150 by the lock cable 250. When the key 300 is turned to a locked position, the fastener 158 fits into the fork 180 to prevent the knob 162 from rotation. When the key 300 is rotated to the unlocked position, the arm 156 rotates out of the fork 180. This rotation not only allows the knob 162 to rotate, but also pulls on the lock cable 250 attached to the fastener 158. The lock cable 250 in turn pulls on the fastener 140 on the impact plate 120, rotating the impact plate 120 and moving the flange 124 from behind the tab 34, allowing the tailgate 20 to be opened.

Figure 14:
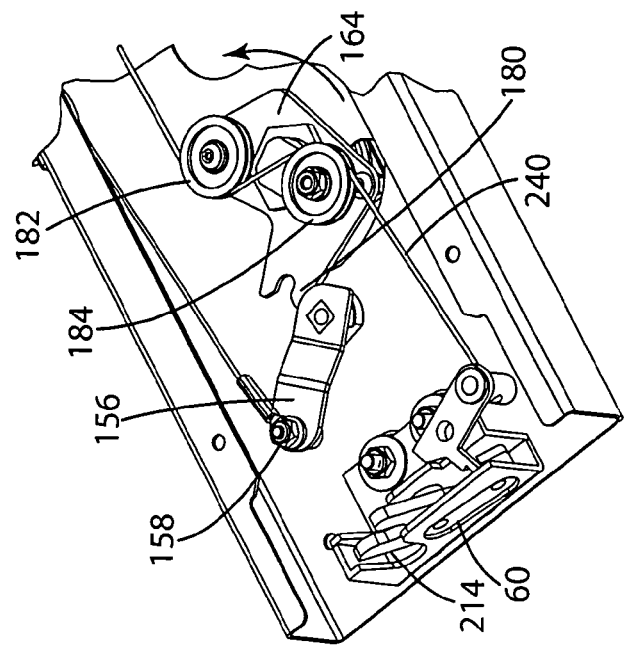
FIG. 14 is a bottom view of the lock in the FIG. 13 position.
Figure 13:
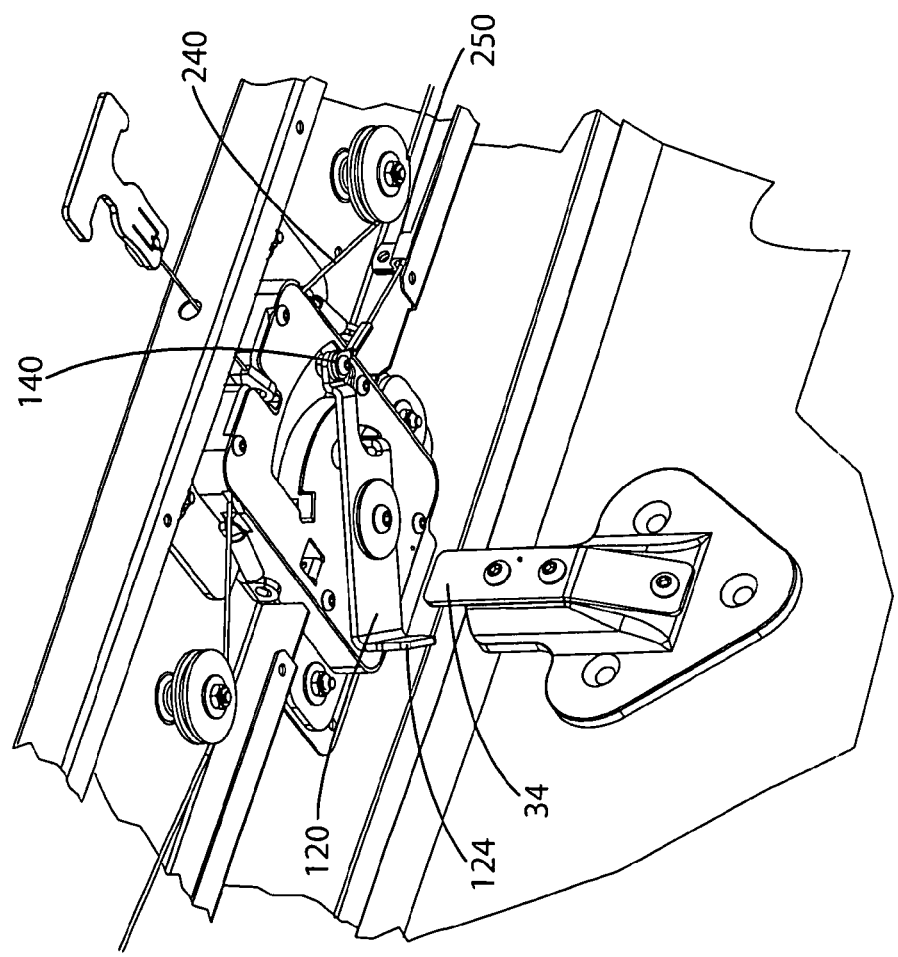
FIG. 13 is a bottom view of the tailgate and cover in a closed position with the latch mechanism in an unlocked position.
Figure 14A:
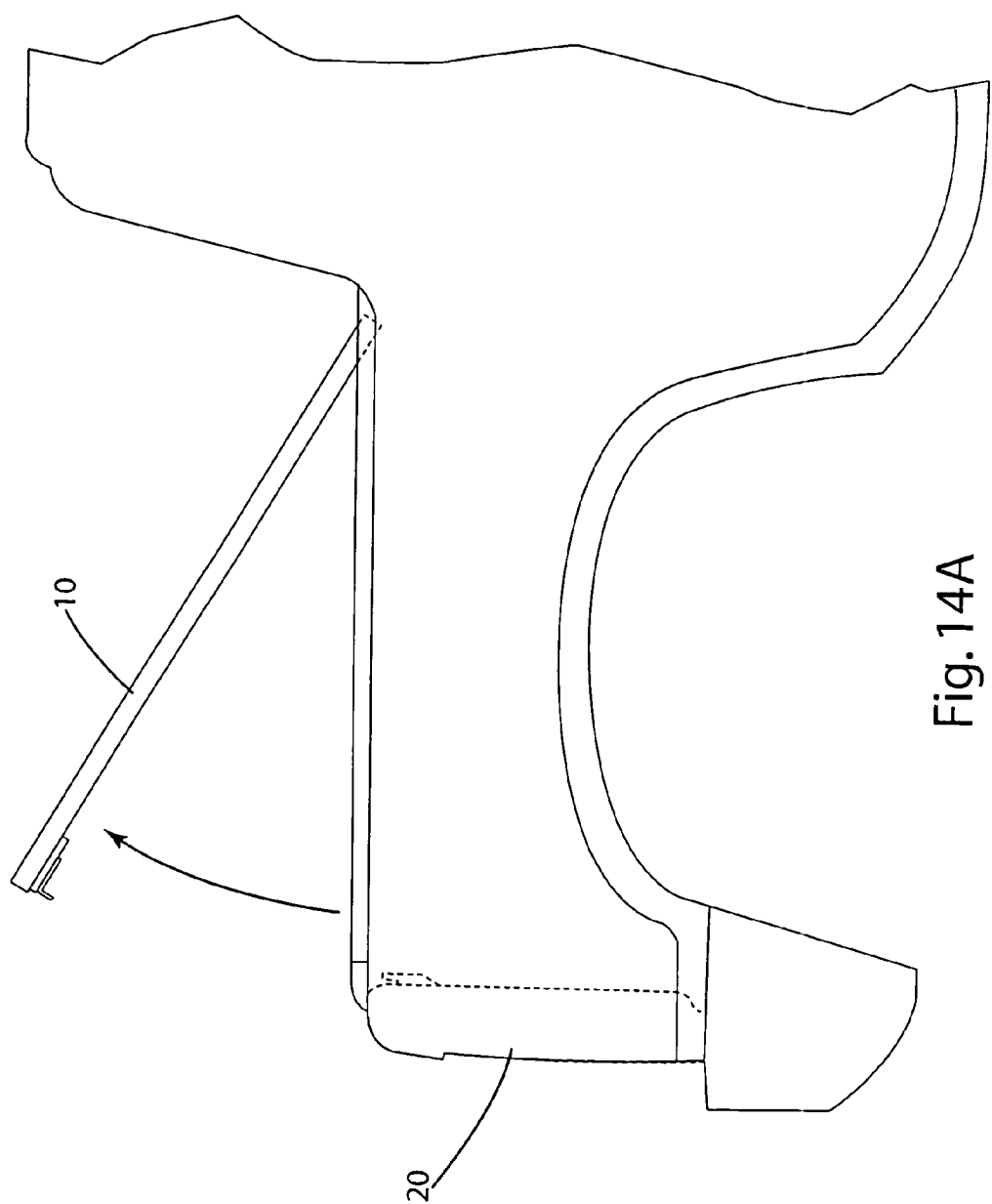
FIG. 14A is a side view of the closed tailgate and open cover.

As shown in FIGS. 13, 14, and 14A, the knob 162 can be manually rotated to open the cover 10. As described above, the lock mechanism 150 prevents the rotation of the knob 162 when the lock 150 is in the locked position with the fastener 158 interfitted with the fork 180. However, when the lock is rotated into the unlocked position, the fastener 158 disengages the fork 180 and permits the knob 162 to be rotated. Rotation of the knob 162 causes the platform 164 to rotate and consequently causes the pulleys 182 and 184 to rotate with the platform 164. As the pulleys 182 and 184 rotate, they pull on the latch cable 240. The latch cable 240 in turn pulls directly on the catch assembly 60, and indirectly on the catch assembly 58 after the cable 240 pulls through the first cable pulley 54, the channel 83, the second cable pulley 52. The catch assemblies 58 and 60 then move to the release position allowing the cover 10 to open.

Figure 16:
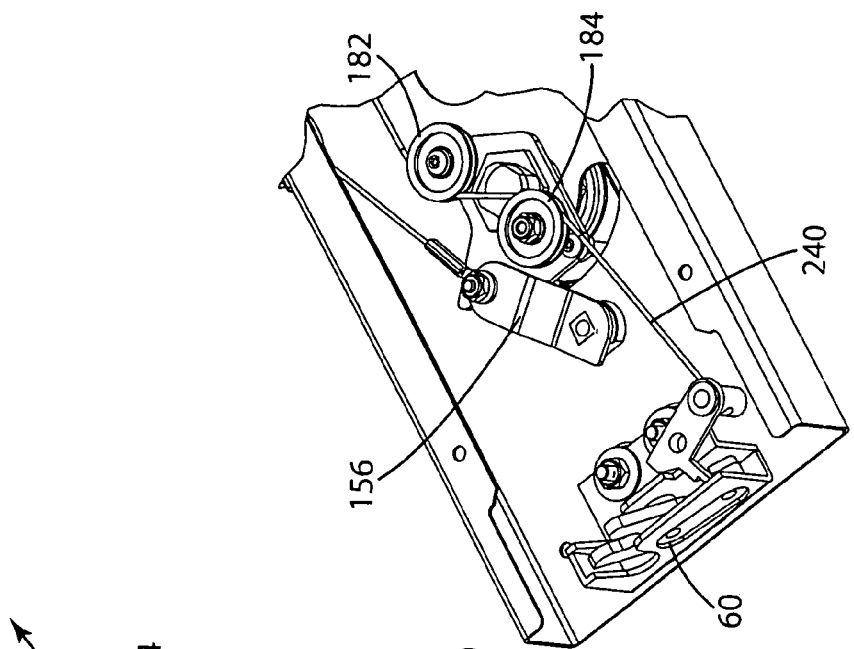
FIG. 16 is a bottom view of the lock in the FIG. 15 position.
Figure 16A:
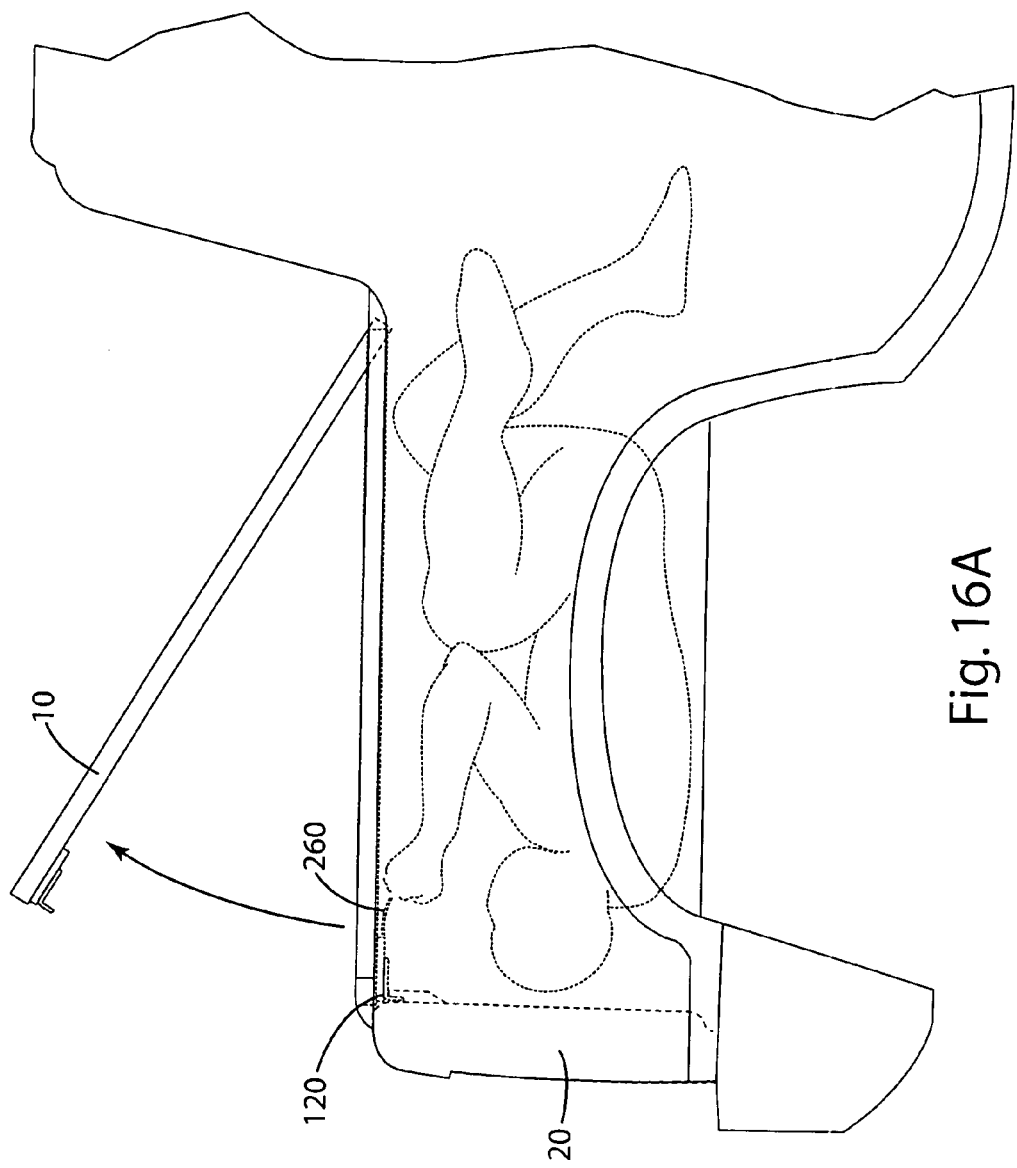
FIG. 16A is a side view of the closed tailgate and open cover with the safety handle pulled.

As shown in FIGS. 15, 16, and 16A, the cover may also be opened by pulling on the safety handle 264. When the safety handle 264 is pulled, the safety cable 260 pulls directly on the latch cable 240 in the notch 96 of the tray 80. The latch cable 240 pulls through pulleys 52, 54, 182, and 184 to pull on the catch assemblies 58 and 60 and move the catch assemblies 58 and 60 to the release position.

The above description is that of a current embodiment of the invention. Various alterations and changes can be made without departing from the spirit and broader aspects of the invention, which are to be interpreted in accordance with the principles of patent law including the Doctrine of Equivalents.

The embodiments of the invention in which an exclusive property or privilege is claimed are defined as follows:

1. A cover for the cargo bed of a vehicle having a tailgate movable between open and closed positions, said cover comprising:
   a cover panel;
   mounting means for mounting said cover panel on the cargo bed so as to be movable between an open position providing access to the cargo bed and a closed position preventing access to the cargo bed; and
   a latch mechanism mounted on said cover panel, said latch mechanism including a latch for securing said cover panel in its closed position, said latch mechanism further including first and second actuators capable of releasing said latch, said first actuator being manually operable when said cover panel is in its closed position, said second actuator adapted to operate automatically when the tailgate is moved to its closed position when the cover is in its closed position.

2. The cover of claim 1 wherein said latch is movable between a secure position wherein said cover panel is secured in its closed position and a release position wherein said cover panel is movable to its open position.

3. The cover of claim 2 wherein said second actuator includes an impact plate, said impact plate movable from a first position to a second position and connected to said latch such that said latch is moved to said release position when said impact plate is moved from said first position to said second position, said impact plate moved from said first position to said second position when impacted by said tailgate as said tailgate is closed.

4. The cover of claim 3 wherein said first actuator includes a knob, said knob being manually actuatable such that actuation of said knob moves said latch to said release position.

5. The cover of claim 4 wherein said latch mechanism further includes a latch cable interconnecting said latch, said impact plate, and said knob, such that movement of said impact plate or said knob pulls on said latch cable and moves said catch to the release position.

6. The cover of claim 5 further comprising a single lock operable between locked and unlocked positions, said lock preventing said latch from moving from the secured position to the release position when said lock is in the locked position.

7. The cover of claim 6 wherein said lock prevents movement of said knob when in the locked position.

8. The cover of claim 7 wherein said impact plate includes a tailgate latch having locked and unlocked positions, said tailgate latch in its locked position securing the tailgate in its closed position.

9. The cover of claim 8 further comprising a lock cable interconnecting said lock and said tailgate latch.

10. The cover of claim 9 wherein said latch cable is guided by at least one pulley disposed between said catch and said impact plate such that movement of said knob or said impact plate pulls said latch cable about said at least one pulley.

11. The cover of claim 10 further comprising a safety handle interconnected with said latch cable, said safety handle movable to pull on said latch cable and move said catch to said release position, said safety handle located inside said cargo bed when said cover is in said closed position.

* * * * *